(12) United States Patent
Gregerson et al.

(10) Patent No.: US 10,921,020 B2
(45) Date of Patent: Feb. 16, 2021

(54) AIR FILTER COMPRISING FRAME WITH BOWED INNER EDGE

(71) Applicant: 3M INNOVATIVE PROPERTIES COMPANY, St. Paul, MN (US)

(72) Inventors: Glen O. Gregerson, Hudson, WI (US); Jonathan M. Lise, Woodbury, MN (US); Kimberly W. Menzenski, Hammond, WI (US); David W. Ziemann, Coon Rapids, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 202 days.

(21) Appl. No.: 16/319,272

(22) PCT Filed: Aug. 1, 2017

(86) PCT No.: PCT/IB2017/054701
§ 371 (c)(1),
(2) Date: Jan. 18, 2019

(87) PCT Pub. No.: WO2018/029576
PCT Pub. Date: Feb. 15, 2018

(65) Prior Publication Data
US 2019/0242616 A1 Aug. 8, 2019

Related U.S. Application Data

(60) Provisional application No. 62/372,113, filed on Aug. 8, 2016.

(51) Int. Cl.
*F24F 13/28* (2006.01)
*B01D 46/00* (2006.01)
(Continued)

(52) U.S. Cl.
CPC .......... *F24F 13/28* (2013.01); *B01D 46/0001* (2013.01); *B01D 46/0005* (2013.01);
(Continued)

(58) Field of Classification Search
CPC ............ B01D 46/0001; B01D 46/0002; B01D 46/0005; B01D 46/0016; B01D 46/10; B01D 46/521; F24F 13/28
See application file for complete search history.

(56) References Cited

U.S. PATENT DOCUMENTS 3,830,045 A * 8/1974 Copenhefer ........... B01D 46/10
55/501
3,938,973 A * 2/1976 Kershaw ............ B01D 46/0002
55/501
(Continued)

FOREIGN PATENT DOCUMENTS

| CA | 2778709 | 12/2012 |
|---|---|---|
| CA | 2830272 | 3/2016 |

(Continued)

OTHER PUBLICATIONS

International Search Report for PCT International Application No. PCT/IB2017/054701, dated Sep. 25, 2017, 5 pages.

*Primary Examiner* — Robert Clemente
(74) *Attorney, Agent, or Firm* — Kenneth B. Wod

(57) ABSTRACT

A framed air filter, comprising an air filter media having a generally rectangular perimeter with four major edges, and a frame comprising four frame portions. Each frame portion of the frame is mounted on one of the four major edges of the air filter media and met with neighbouring frame portions to form corners of the frame. At least one of the frame portions is provided by a frame piece that comprises first, second, third and fourth panels that are foldably connected by fold lines, which single frame piece is wrapped in a generally rectangular configuration so that the fourth panel (Continued)

comprises a forward terminal end that is abutted proximal a rearward major surface of the first panel. The third panel provides a rear wall of the frame portion with an inner edge provided by a fold line connecting the third panel to the fourth panel, wherein the inner edge is bowed.

19 Claims, 8 Drawing Sheets

(51) Int. Cl.
  *B01D 46/10* (2006.01)
  *B01D 46/52* (2006.01)
(52) U.S. Cl.
  CPC ........ *B01D 46/0016* (2013.01); *B01D 46/10* (2013.01); *B01D 46/521* (2013.01)

(56) References Cited

U.S. PATENT DOCUMENTS

| | | | |
|---|---|---|---|
| 3,970,440 A * | 7/1976 | Copenhefer | B01D 46/10 55/501 |
| 3,992,173 A | 11/1976 | Wharton | |
| 4,086,071 A | 4/1978 | Champlin | |
| 4,105,423 A | 8/1978 | Latakas | |
| 4,372,763 A * | 2/1983 | Champlin | B01D 46/0016 55/501 |
| 4,561,587 A * | 12/1985 | Wysocki | B01D 46/0002 210/232 |
| 4,636,233 A * | 1/1987 | Lizmore | B01D 46/0002 229/172 |
| 6,126,707 A | 10/2000 | Pitzen | |
| 8,491,690 B2 | 7/2013 | Crabtree | |
| 9,174,159 B2 * | 11/2015 | Sanocki | B01D 46/0001 |
| 2004/0148915 A1 * | 8/2004 | Lipner | B01D 46/0002 55/495 |
| 2007/0204574 A1 * | 9/2007 | Workman | B01D 46/10 55/495 |
| 2007/0289271 A1 | 12/2007 | Justice | |
| 2007/0289273 A1 | 12/2007 | Boyd | |
| 2007/0294988 A1 | 12/2007 | Miller | |
| 2008/0163595 A1 | 7/2008 | Knapp | |
| 2009/0183477 A1 | 7/2009 | Workman | |
| 2010/0269467 A1 | 10/2010 | Crabtree | |
| 2010/0269468 A1 * | 10/2010 | Crabtree | B01D 46/10 55/499 |
| 2012/0272829 A1 * | 11/2012 | Fox | B01J 20/28011 96/154 |
| 2012/0317944 A1 * | 12/2012 | Lise | B01D 46/0001 55/499 |
| 2013/0327004 A1 | 12/2013 | Lise | |
| 2015/0047507 A1 * | 2/2015 | Fox | B01D 46/0032 96/74 |
| 2015/0047508 A1 * | 2/2015 | Sanocki | B01D 46/0001 96/74 |
| 2015/0165359 A1 * | 6/2015 | Chamberlain | B01D 46/0016 55/494 |
| 2015/0265957 A1 | 9/2015 | Fox | |
| 2019/0046910 A1 * | 2/2019 | Gregerson | B01D 46/10 |
| 2019/0217239 A1 * | 7/2019 | Gregerson | B01D 46/0005 |
| 2020/0129907 A1 * | 4/2020 | Fox | B01D 46/10 |

FOREIGN PATENT DOCUMENTS

| | | |
|---|---|---|
| GB | 1439831 | 6/1974 |
| WO | 2000-051710 | 9/2000 |
| WO | 2011-088185 | 7/2011 |

* cited by examiner

AIR FILTER COMPRISING FRAME WITH BOWED INNER EDGE

BACKGROUND

Framed air filters are often used in air-handling systems, e.g. heating and air conditioning systems, room air purifiers and the like, in order to remove airborne particles such as e.g. dust, dirt, and pollen.

SUMMARY

In broad summary, disclosed herein in one aspect is a framed air filter in which at least one portion of the frame is provided by a wrapped frame piece that exhibits a bowed inner edge. This and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
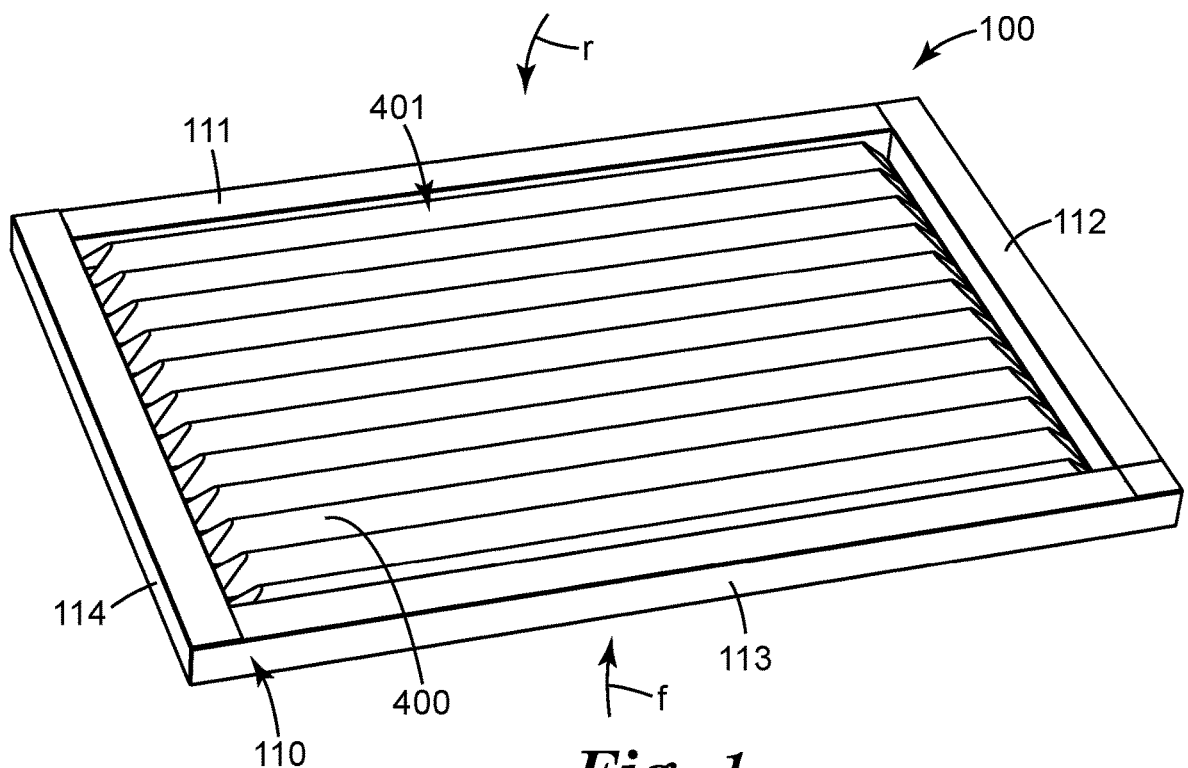
FIG. 1 is a perspective view, from the rear side, of an exemplary framed air filter.

Like reference numbers in the various figures indicate like elements. Some elements may be present in identical or equivalent multiples; in such cases only one or more representative elements may be designated by a reference number but it will be understood that such reference numbers apply to all such elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Glossary

Terms such as front, forward, and the like denote a direction toward the side of a frame to which filter media is attached (as seen e.g. in FIG. 3); terms such as rear, rearward, and the like denote the opposing side, as discussed in detail herein. The front-rear axis of the frame will generally correspond to the upstream-downstream axis of airflow through the framed filter, although the air may flow in either direction along this axis, as noted later.

Terms such as outer, outward, inner, inward, and the like refer to laterally outward and inward directions unless otherwise specified. The term lateral is defined with respect to a framed filter as a whole, and refers to directions aligned with the major plane of the framed filter. Laterally inward refers to directions toward the geometric center of the framed filter (i.e., toward the center of the active filtration area of the framed filter); laterally outward refers to directions away from the geometric center of the framed filter.

By foldably-connected is meant that two panels of a frame piece are connected along a fold line (provided by a line of weakness, e.g. a score line), which fold line allows the two panels to be folded relative to each other along the fold line while allowing each panel to remain at least generally planar.

By a frame portion is meant an elongate section of a filter frame, which section extends along one of the four major sides of the frame. By a frame piece is meant an integral item that comprises elongate panels that are foldably connected by fold lines that extend along the elongate length of the frame piece and that can be wrapped to form a frame portion. By a frame part is meant an integral entity that includes four frame pieces that are each integrally connected to two neighboring frame pieces of the frame part.

As used herein as a modifier to a property or attribute, the term "generally", unless otherwise specifically defined, means that the property or attribute would be readily recognizable by a person of ordinary skill but without requiring a high degree of approximation (e.g., within +1-20% for quantifiable properties). The term "essentially" means to a high degree of approximation (e.g., within plus or minus 4% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

DETAILED DESCRIPTION

Shown in FIG. 1 in perspective view from the rear side is an exemplary framed air filter 100. As noted in the Glossary, the front of a framed filter (and components thereof, such as frame 110) denotes the side of the frame filter on which the filter media (specifically, an end portion of the filter media that is attached to the frame) is located; the term rear denotes the opposing side. Certain figures (e.g. FIGS. 1 and 3) are marked with "f" and "r" to aid in recognition of the front and rear sides of framed air filters and components thereof. However, these terms are used purely for convenience of description and do not signify any specific manner in which a framed filter must necessarily be installed in an air handling system. That is, any such filter may be installed in an air handling system (e.g. of a building HVAC system, of a room air purifier, and so on), with the front side, or the rear side, being an upstream side that faces the stream of incoming air.

Figure 2:
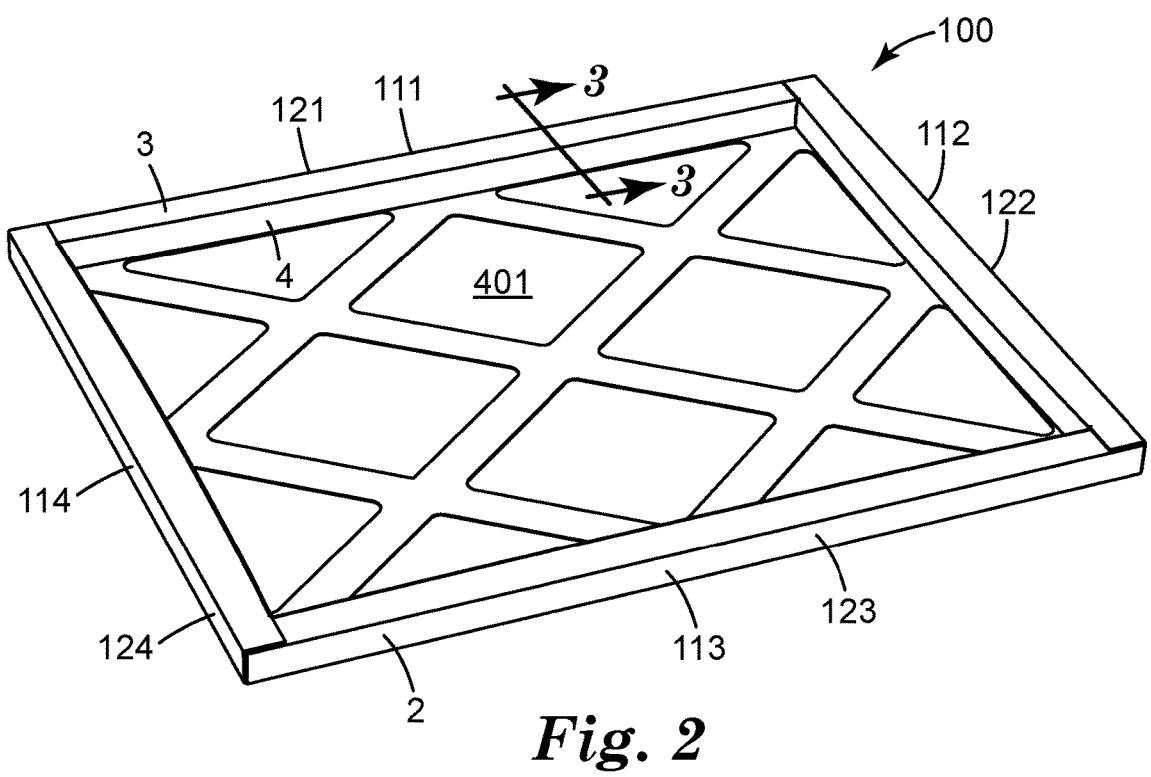
FIG. 2 is a perspective view of the frame of the exemplary framed air filter of FIG. 1, with the filter media omitted.

Framed air filter 100 includes filter media 400 (which may be any desired filter media, e.g. pleated or unpleated, monolayer or multilayer, and so on) and a perimeter frame 110. The frame 110 is mounted generally on, and surrounds, a perimeter of the filter media 400. The framed air filter 100 can be at least generally rectangular in shape (which specifically includes square shapes) having e.g. four corners. The perimeter of filter media 400 thus can have a generally rectangular shape (which does not preclude irregularities, notches, chamfered or angled corners, or the like, along the perimeter). Frame 110 may thus take the form of an at least generally rectangular frame with four frame portions 111, 112, 113, and 114 (as seen in FIGS. 1 and 2) that are each mounted on one of the four major edges of the filter media. Each frame portion is elongated along one edge of the filter media 400 and meets a neighboring frame portion at a corner of the frame; the four frame portions in combination collectively define frame 110. Each frame portion is obtained from the wrapping of a frame piece, as described herein.

Figure 3:
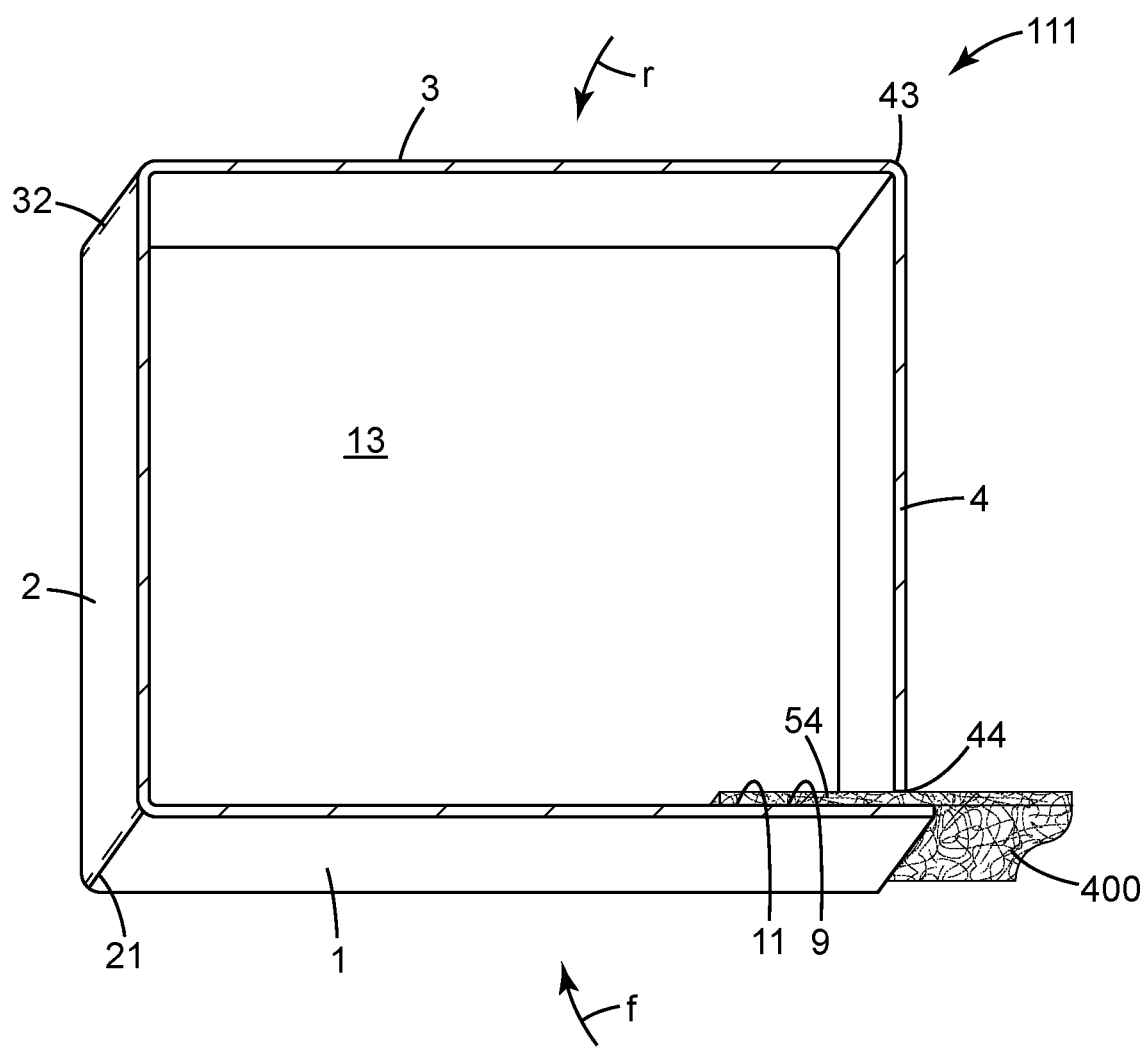
FIG. 3 is a cross-sectional slice view of a portion of the frame of FIG. 2, taken along slice 3-3.

A frame portion is formed from a single frame piece that comprises multiple panels that are foldably connected by fold lines. By way of specific example, frame portion 111 of FIGS. 1-3 is provided by single frame piece 121 of FIG. 4. That is, single frame piece 121 (as shown in a flat state in FIG. 4) can be wrapped, by folding various panels of frame piece 121, to form frame portion 111 as shown in FIG. 3 and as discussed in detail later herein. By a frame portion being provided by a single frame piece is meant that the particular frame portion is formed from a single frame piece rather than by using (e.g., wrapping) multiple, separate frame pieces together. All four frame portions are portions of the same frame part. That is, with reference to FIGS. 2 and 4, individual frame pieces 121, 122, 123, and 124 are all pieces of a single, integral frame part 120, and respectively provide portions 111, 112, 113, and 114 of frame 110 formed therefrom.

Figure 4:
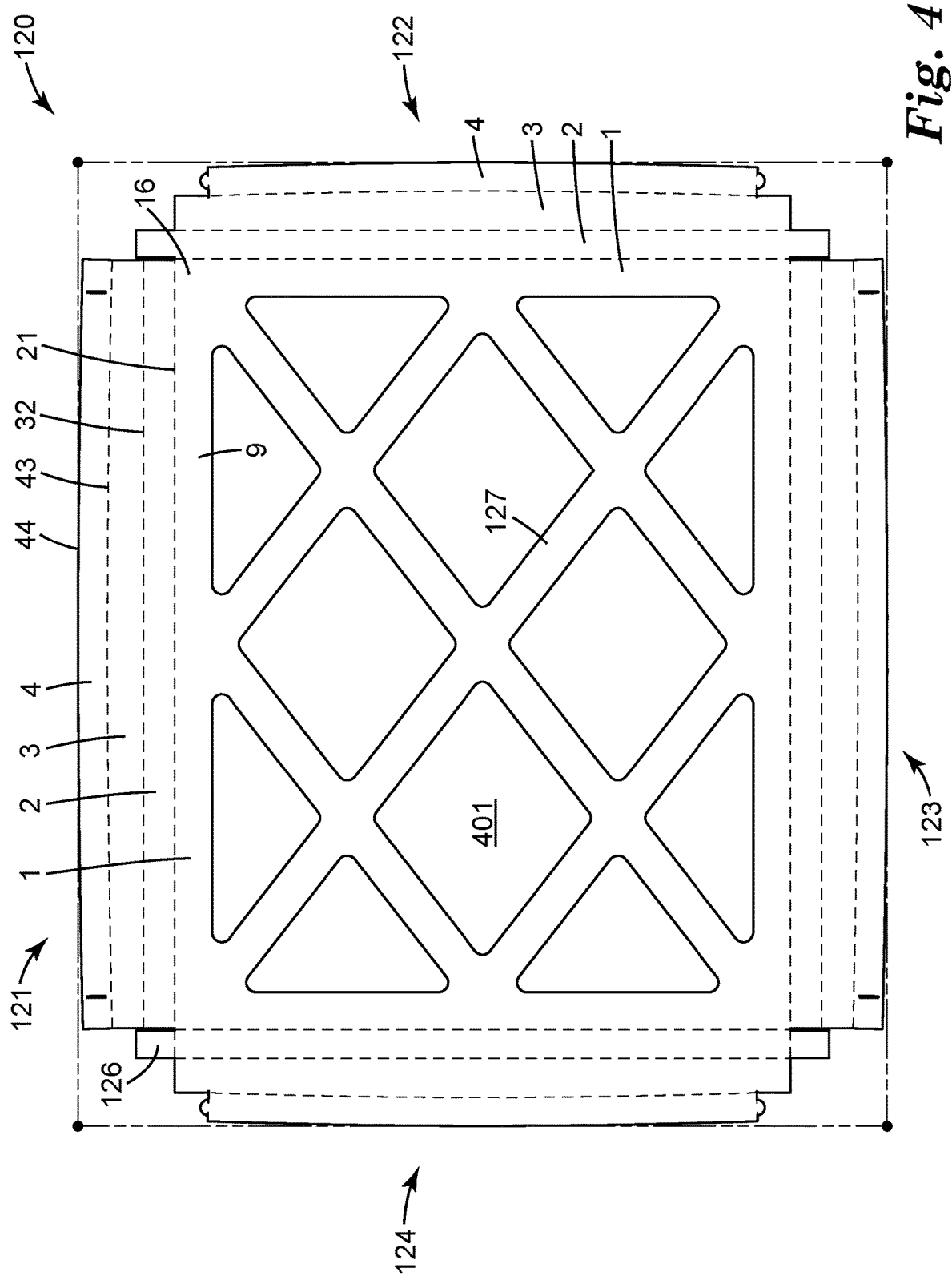
FIG. 4 is a plan view of an exemplary frame part in a flat, unwrapped state.

As shown in FIG. 4, panels of a frame piece are foldably connected by fold lines. For example, panels 1 and 2 of frame piece 121 are foldably connected to each other via fold line 21. Such fold lines are typically aligned with the elongate length of the frame piece and can extend along at least a significant extent (e.g., 80, 90, 95, 98, or 100%) of the elongate length of the frame piece so that the panels can be folded along the fold lines (e.g. to an angle of about 90 degrees between any two foldably-connected panels) so that frame piece is wrapped to form a frame portion that exhibits an elongate length. Such fold lines can be achieved by any known method that provides lines of weakness along which two panels can be folded relative to each other but with the majority of the area of each panel (except for e.g. a small portion of the area close to the fold line) remaining at least generally planar. Such fold lines can be provided e.g. by scoring, partially perforating, or using any other suitable method to provide a path along which a fold may be preferentially formed. Such score lines may be most applied to either or both sides of the frame piece, as desired.

As used herein, the term foldably connected as applied to any two specific panels of a frame piece denotes that the two panels are directly connected to each other. By way of specific examples, panels 1 and 2 of frame piece 121 of FIG. 4 are directly foldably connected to each other; panels 1 and 3 of frame piece 121 of FIG. 4 are not directly foldably connected to each other. (A generic reference to e.g. "panels that are foldably connected by fold lines" does not require that every single one of the panels is directly foldably connected to every other panel; rather, it merely implies that all of the panels are foldably connected to each other, whether directly by a single fold line or indirectly by two or more fold lines.) In any event, in no sense does the term foldable imply that a frame portion (or the entirety of a frame), once formed, is foldable in the sense that it can be collapsed or folded flat. In fact, as will be made clear herein, frames as disclosed herein, once formed, can exhibit satisfactory structural rigidity and are typically resistant to folding or collapsing.

The disclosed wrapped frame can be made from a frame part (comprising one or more frame pieces as explained herein) that is made of any suitable material, e.g. plastic, metal and so on. In many convenient embodiments, the frame part may be made of cellulosic chipboard (paperboard), of any suitable thickness that provides sufficient mechanical rigidity but that also allows (e.g. when provided with score lines) the ability to form a foldable connection. In various embodiments, such paperboard may range from at least about 16, 18, 20, 22, or 24 thousandths of an inch in thickness, to at most about 36, 34, 32, 30, or 28 thousandths of an inch in thickness. At least one side of the paperboard may comprise a decorative coating or layer if desired.

A frame piece is formed into a frame portion by wrapping foldably-connected panels of the frame piece. In further detail, exemplary frame portion 111 of FIG. 3 is formed by wrapping first panel 1, second panel 2, third panel 3, and fourth panel 4, of frame piece 121 of FIG. 4. First panel 1 and second panel 2 are foldably connected (to each other) by fold line 21, second panel 2 and third panel 3 are foldably connected by fold line 32, and third panel 3 and fourth panel 4 are foldably connected by fold line 43. Fourth panel 4 is a terminal panel of frame piece 121 (and thus of frame portion 111 formed therefrom) and thus comprises a terminal end 44 that is not directly connected (foldably or otherwise) to any other panel of frame piece 121.

As shown in exemplary embodiment in FIG. 3, first panel 1 will provide a front wall, second panel 2 will provide an outer sidewall, third panel 3 will provide a rear wall, and fourth panel 4 will provide an inner sidewall, of the wrapped frame portion. In like manner, similar panels of the three other frame pieces (122, 123 and 124) can be likewise wrapped to form the three other portions (112, 113, and 114) of frame 110. For example, panels 1-4 of frame piece 122 of FIG. 4 will be wrapped to form the various walls of frame portion 112 of FIG. 2. (This being the case, in FIG. 4 the various panels of frame piece 122 are given the same numbering as the corresponding panels of frame piece 121.)

As shown in exemplary manner in FIG. 3, in some embodiments a frame piece can be wrapped so that a forward terminal end 44 of fourth panel 4 of the frame piece is abutted proximal to rearward major surface 11 of first panel 1 of the frame piece. (The width of first panel 1 may be at least slightly larger than the corresponding width of third panel 3 (e.g. as evident in FIG. 3) to ensure that terminal end 44 of fourth panel 4 is abutted proximate first panel 1 in this manner.) By abutted proximal to rearward major surface 11 is meant that end 44 will be positioned close to rearward major surface 11 and will be separated therefrom by the thickness of air filter media 400. That is, in some embodiments at least some of a border area 54 of air filter media 400 may be attached to first panel 1 (e.g., may be adhesively bonded to rearward major surface 11 of first panel 1 as described below) so that a linear segment of area 54 of the filter media is sandwiched between forward terminal end 44 of fourth panel 4 and rearward major surface 11 of first panel 1.

In some embodiments, forward terminal end 44 of fourth panel 4 of a frame portion may be a floating end, meaning that it is not attached (either directly, or indirectly through the thickness of the air filter media) to first panel 1 of the frame portion. That is, in such embodiments end 44 of panel 4 will not be purposefully attached (whether by mechanical means such as staples, or by an adhesive) to rearward major surface of first panel 1. Such a requirement does not preclude some incidental contact between an adhesive that might be present e.g. on an outward major surface of panel 4 (e.g. in the event that an entire major surface of a frame part is covered with adhesive, e.g. for simplicity of assembling the frame), and air filter media 400. In other words, in some instances a small amount of adhesive may flow down the outward surface of panel 4 e.g. under the influence of gravity so as to contact air filter media 400 and/or first panel 1; such events may be expected to occasionally occur in any real-life production process, and will be distinguished from purposeful attachment of panel 4 to panel 1.

With further reference to FIG. 3, in particular embodiments at least a bonding area 9 of rearward major surface 11 of first panel 1 may comprise an adhesive disposed thereon so as to bond border area 54 of air filter media 400 thereto. Such an adhesive might be deposited e.g. continuously along most or essentially all of the elongate length of the frame portion; or, the adhesive might be deposited at discrete locations along the frame portion. With reference to FIG. 4, such an adhesive might be provided e.g. along at least inward areas of panels 1 of the four frame pieces 121, 122, 123 and 124 (e.g. to provide a picture-frame adhesive area to which border areas of the air filter media can be bonded). Such an adhesive serves to bond air filter media 400 to the frame; such an adhesive will not contribute to stabilizing the frame pieces in their wrapped configuration, nor will it contribute to bonding neighboring frame portions to each other at corners of the frame.

In at least some embodiments, a frame piece when wrapped into a frame portion, forms an at least generally rectangular configuration (that is, it encloses an at least generally rectangular interior space 13, as in FIG. 3). A "generally rectangular" interior space of a frame portion is not required to be a perfect rectangle (or square). Deviations from this are permitted, which deviations can be characterized in terms of an angle that is permitted between the major planes of panels 2 and 4 (that respectively provide outer and inner sidewalls of the frame portion). Such deviations can also be characterized in terms of an angle that is permitted between the major planes of panels 3 and 1 (that respectively provide a rear wall, and a front wall, of the frame portion).

Thus in various embodiments, a major plane of second panel 2 may be oriented within plus or minus 40, 20, 10, or 5 degrees of a major plane of fourth panel 4. In various embodiments, a major plane of third panel 3 may be oriented within plus or minus 40, 20, 10, or 5 degrees of a major plane of first panel 1. In some embodiments second panel 2 may be oriented within plus or minus 5 degrees of fourth panel 4 and third panel 3 may be oriented within plus or minus 5 degrees of first panel 1. In specific embodiments (e.g. as in FIG. 3), panels 2 and 4 may be essentially parallel to each other and panels 3 and 1 may be essentially parallel to each other (with the resulting frame portion thus being essentially rectangular in shape).

The first through fourth panels of each of the four frame pieces may be wrapped to form frame portions, and filter media bonded e.g. to the first panels of one or more of the frame pieces, to form a framed air filter as disclosed herein. This process will be described in detail with reference to FIGS. 5-9. It is clear from FIGS. 4 and 5 that the first panels 1 of neighboring frame pieces (frame pieces 121 and 122 for the particular corner of the frame depicted in FIG. 5) meet at area 16 so as to provide an integral connection between the frame pieces and thus between the frame portions formed therefrom. Neighboring frame pieces can be wrapped, and certain sections of each frame piece may be joined with certain sections of a neighboring frame piece, to stabilize a corner at which the two pieces meet. Performing this process for all four corners of the frame will stabilize all four corners. Certain arrangements may stabilize each frame piece in its wrapped condition all along the elongate length of the frame piece, as will be appreciated from the detailed descriptions to follow. It will be appreciated that the order of operations may be varied from the exemplary order described below. The operations are described for exemplary neighboring frame pieces 121 and 122 but it will be understood that similar operations may be carried out for all four frame pieces and for all four corners of the resulting frame.

Figure 5:
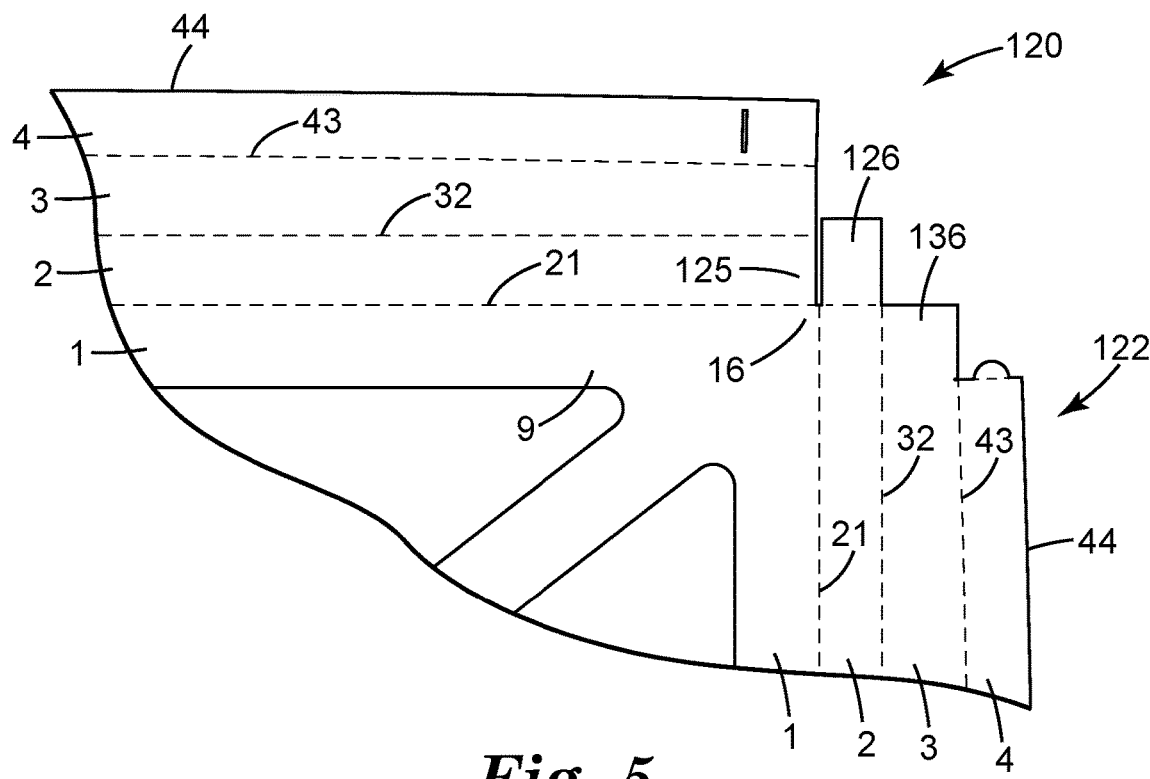
FIG. 5 is a magnified plan view of a corner area of the exemplary frame part of FIG. 4.
Figure 6:
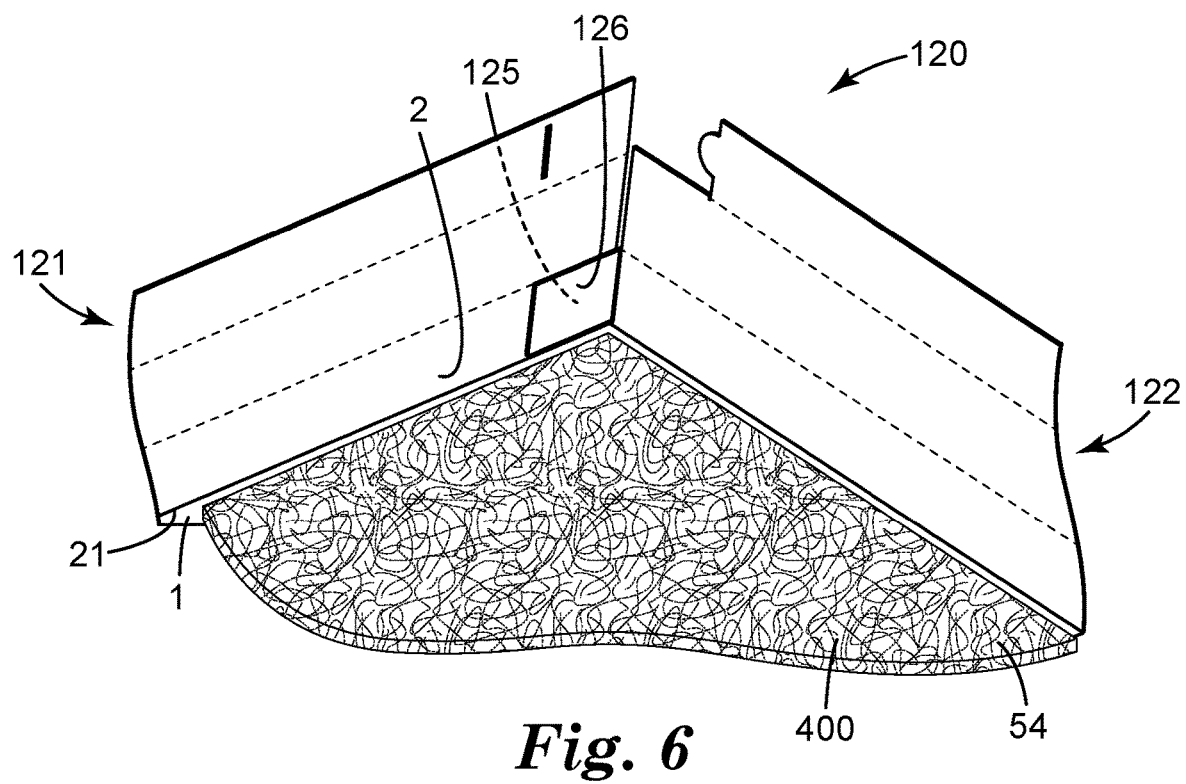
FIG. 6 is a perspective view of the corner area of FIG. 5, in a partially wrapped configuration and with an air filter media installed.

In an initial step, frame pieces 121 and 122 as shown in FIG. 5 may each be folded (e.g. to about 90 degrees) along their respective fold lines 21, to provide an arrangement as shown in FIG. 6. (Filter media 400 may be attached to the frame pieces, e.g. border areas 54 may be adhesively bonded to bonding areas 9 of first panels 1 of each frame piece, e.g. before or after this folding operation.)

In some embodiments, it may be useful to provide a corner tab at a laterally terminal end of a second panel of a frame piece (which second panel will provide an outer sidewall of the frame portion formed from that frame piece). Such a tab 126 is shown in exemplary embodiment in FIG. 5 and extends integrally from a terminal end of second panel 2 of frame piece 122. Tab 126 is hingedly connected (e.g. by a fold line) to the terminal end of second panel 2 and defines an outer sidewall of the frame at the corner between the frame pieces 121 and 122. As shown in FIG. 6, corner tab 126 integrally extends from the terminal end of second panel 2 of frame piece 122 at an angle of about 90 degrees, so that it is in overlapping relation with a mating area 125 of second panel 2 of frame piece 121. In the exemplary embodiment of FIG. 6, tab 126 is in inward overlapping relation with mating area 125, but in other embodiments tab 126 can be in outward overlapping relation with mating area 125. Tab 126 can be attached to mating area 125 by any suitable means, for example by the use of an adhesive that is disposed on a surface of tab 126 and/or a surface of mating area 125, or e.g. by stapling.

Such a corner tab may enhance the structural rigidity of a corner of the finished frame, may reduce air leaks through the corner, and so on. Such a tab may be provided at e.g. one, two, three, or all four corners of the frame (a four-tabbed-corners arrangement will be provided by the exemplary design of FIG. 4). In the design of FIG. 4, the tabs 126 are provided in pairs on shortest frame pieces (i.e., pieces 124 and 122). However, in other embodiments a tab or tabs may be provided on longest frame pieces.

Figure 7:
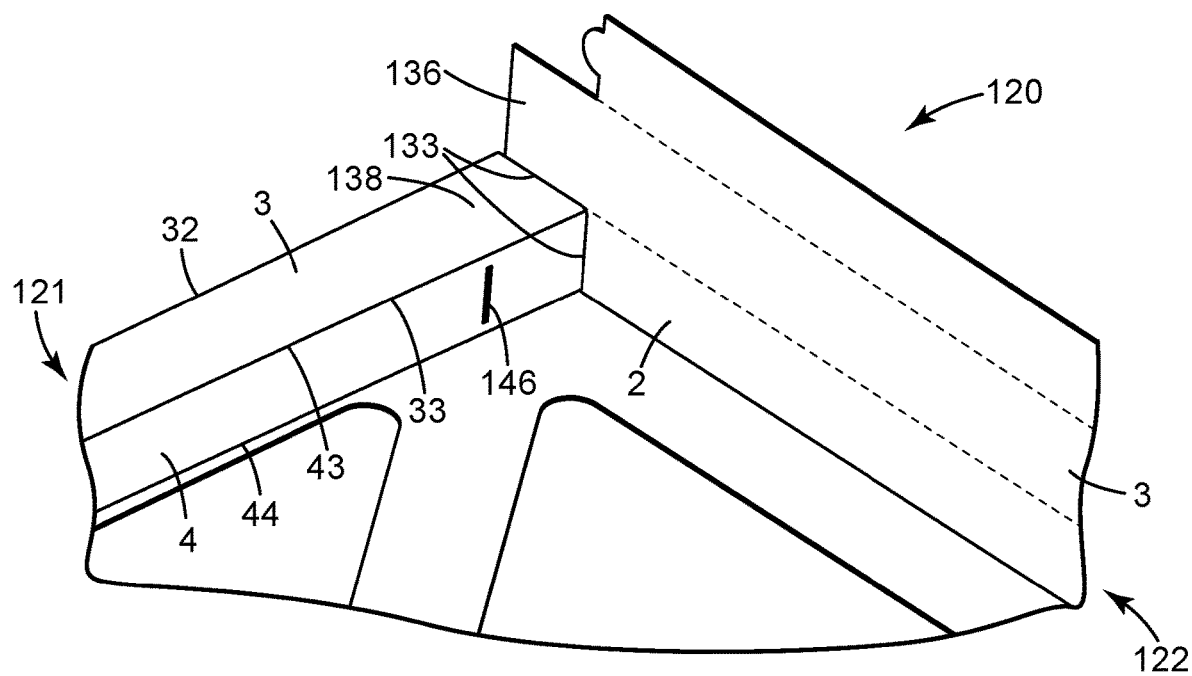
FIG. 7 is a perspective view of the corner area of FIG. 6, in a further partially wrapped configuration.

In a next step, a frame piece (e.g. frame piece 121) may be wrapped to provide an arrangement shown in FIG. 7. (In FIGS. 7-10 and 12-13, the filter media is omitted for ease of presentation of the details of the frame.) Specifically, frame piece 121 is folded along fold lines 21, 32 and 43 (e.g. to angles of about 90 degrees) so as to exhibit a cross-sectional appearance of the general type shown in FIG. 3. In such an arrangement, terminal ends 133 of at least some of panels 1-4 of frame piece 121 may be abutted against (that is, in direct contact with) an inward surface of second panel 2 of neighboring frame piece 122, as shown in FIG. 7.

Figure 8:
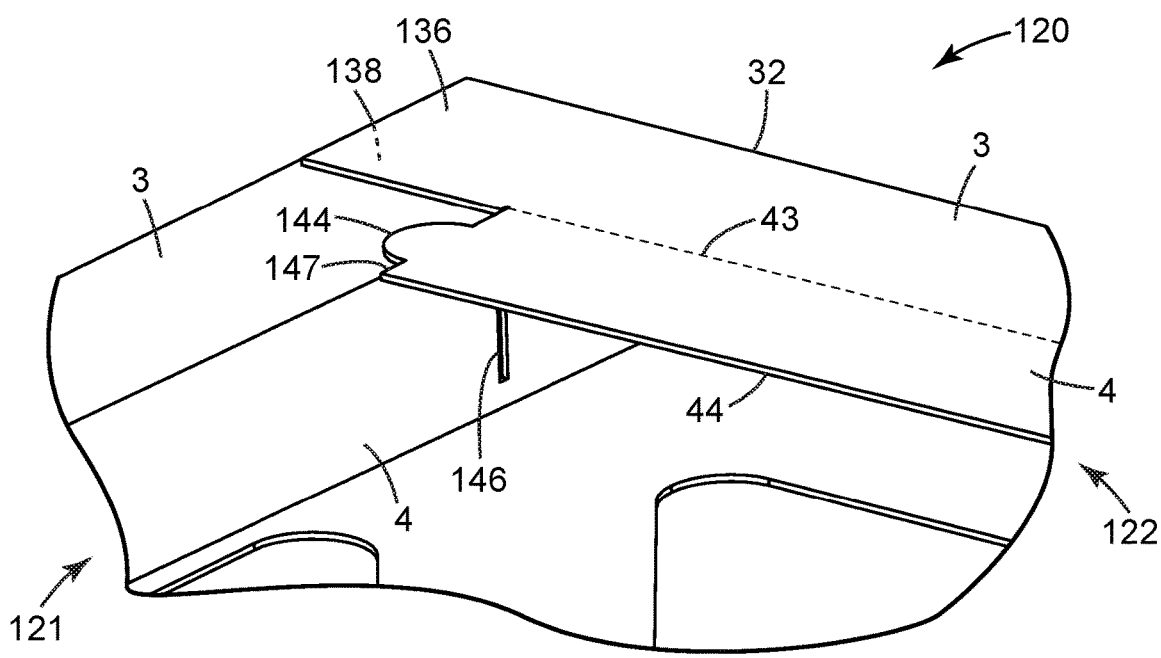
FIG. 8 is a perspective view of the corner area of FIG. 7, in a still further partially wrapped configuration.

In a next step, neighboring frame piece 122 may be folded along fold line 32 to provide the arrangement shown in FIG. 8. Upon this frame piece being folded along fold line 32, area 136 of third panel 3 of frame piece 122 will be brought into contact with mating area 138 of third panel 3 of frame piece 121. In order to stabilize the thus-formed corner of the frame, areas 136 and 138 of the third panels of the frame pieces can be attached to each other in any suitable manner. For example, an adhesive can be provided in area 136 of third panel 3 of frame piece 122, and/or an adhesive can be provided in area 138 of third panel 3 of frame piece 121. And, of course, areas 136 and 138 could be mechanically attached to each other (e.g. via staples) rather than by use of an adhesive. However achieved, such bonding may be performed at e.g. one, two, three, or all four corners of the frame.

In some embodiments, it may be beneficial for two neighboring frame pieces that form a corner of the finished frame to include features whereby the fourth panels 4 (that provide the inner sidewalls of the wrapped frame portions) of each frame piece can physically interact with one another even in the absence of any applied adhesive or of any separately applied bonding means (such as e.g. staples). This may serve to enhance the rigidity of the corner of the final, finished frame. In addition to this, or instead of this, such an arrangement can provide that the two frame portions can physically interact with each other in a self-stabilizing manner so as to collectively reduce the tendency of each frame portion to unfold from a wrapped configuration. This may provide that the corner (e.g., the entire frame) may be at least somewhat self-stabilizing in the wrapped configuration e.g. while waiting for an adhesive to fully harden, which may simplify the assembly process.

Thus, in some embodiments (as shown in exemplary manner in FIG. 8), a frame piece (frame piece 122 in FIG. 8) may comprise a locking tab 144 that integrally extends from a laterally-terminal end 147 of the fourth panel 4 of the frame piece. And, another, neighboring frame piece (frame piece 121, in FIG. 8) may comprise a receiving slot 146 that is present in the fourth panel 4 thereof and that is configured to receive at least a section of the locking tab 144 of frame piece 122.

Figure 9:
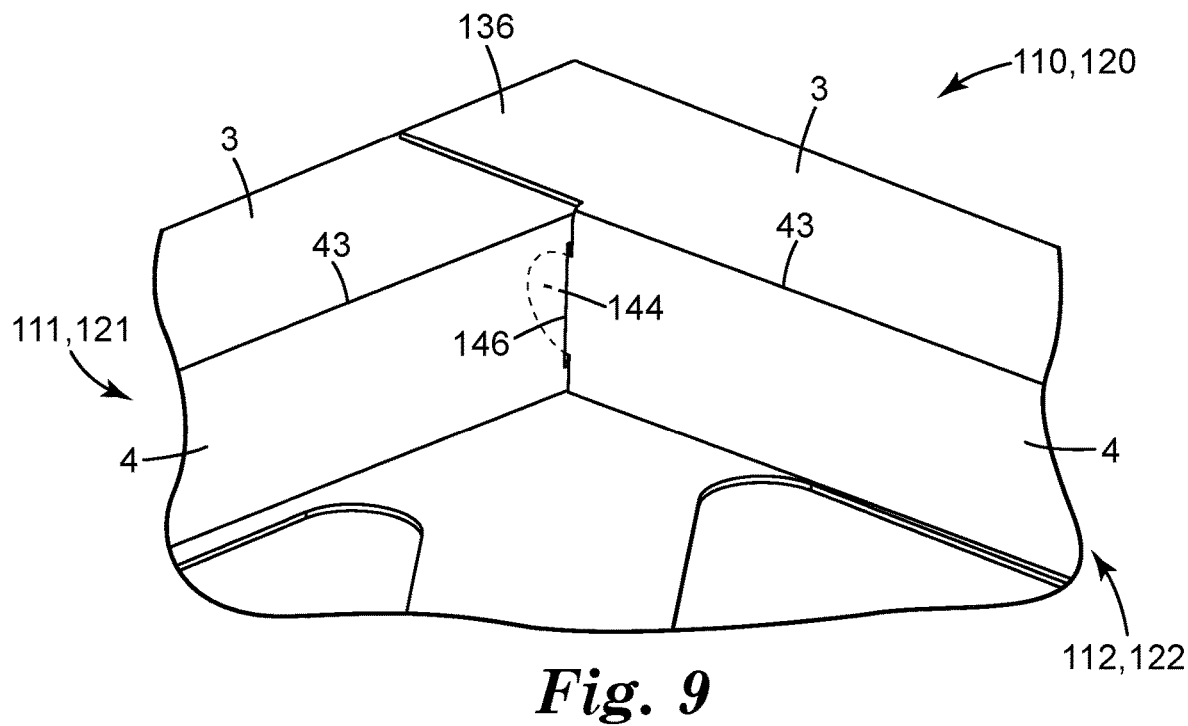
FIG. 9 is a perspective view of the corner area of FIG. 8, in a final, wrapped configuration.
Figure 10:
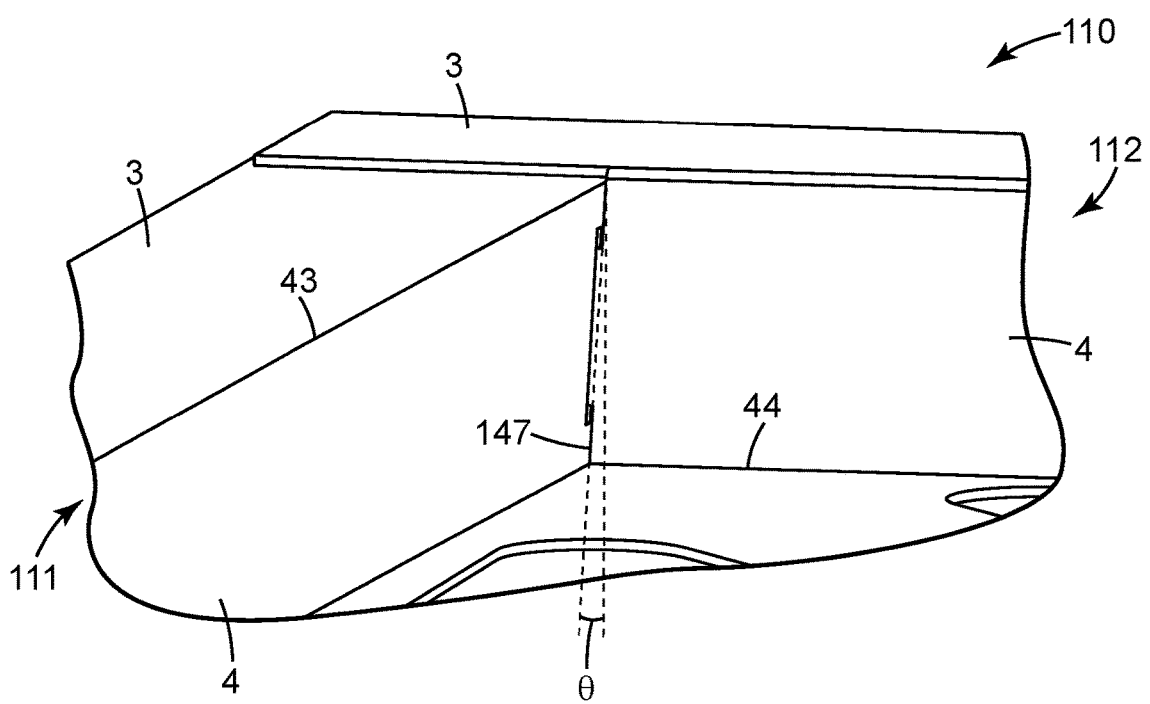
FIG. 10 is a perspective view of a corner area of an exemplary frame in a final, wrapped configuration.

In a next step frame piece 122 may thus be folded along fold line 43 (as visible in FIG. 8) and locking tab 144 outwardly inserted into receiving slot 146, to provide the arrangement shown in FIG. 9. (In some embodiments, locking tab 144 may be rounded, tapered or otherwise shaped so as to more easily allow entry of locking tab 144 into receiving slot 146.) When two neighboring frame pieces are wrapped and manipulated to form a corner in this manner, the interaction of the locking tab and the receiving slot may physically interfere with any tendency of the two frame pieces to unwrap. The two neighboring frame pieces are thus mutually reinforcing in their wrapped arrangement.

Such arrangements may be provided at e.g. one, two, three, or all four corners of the frame (all four corners will comprise such an arrangement in the exemplary design of FIG. 4). In the design of FIG. 4, locking tabs 144 are provided in pairs on shortest frame pieces (i.e., pieces 124 and 122), and receiving slots are provided in pairs on longest frame pieces (i.e. pieces 121 and 123). However, in other embodiments these arrangements may be varied (e.g. reversed) if desired.

Undercut Angle

In some embodiments, the stability of a frame corner may be enhanced by arranging a laterally-terminal end 147 of a fourth panel 4 (which panel provides an inner sidewall) of a frame portion with an undercut angle. Such an undercut angle is shown in exemplary embodiment in FIG. 10, in which laterally-terminal end 147 of fourth panel 4 of frame portion 112 exhibits an undercut angle denoted θ. The magnitude of an undercut angle indicates the amount to which a laterally-terminal end of a fourth panel deviates from a purely front-rear direction of the framed filter. The presence of such an undercut angle means that a frontmost segment of laterally-terminal end 147 (in other words, the point at which laterally-terminal end 147 meets the previously-described terminal end 44) will protrude further in a lateral direction (specifically, toward a fourth panel 4 of a neighboring frame portion 111) than does the segment of laterally-terminal end 147 that is proximate third panels 3 of frame portions 111 and 112. This can enhance the ability of the frontmost segment of laterally-terminal end 147 of frame portion 112 to prevent fourth panel 4 of frame portion 111 from unfolding. In some embodiments, frontmost segment of laterally-terminal end 147 of frame portion 112 may urge a frontmost segment of fourth panel 4 of neighboring frame portion 111 laterally outward (i.e., in an opposite direction from the direction in which panel 4 of frame portion 111 might tend to unfold along fold line 43), to minimize the onset of any such unfolding. Such arrangements may enhance the stability of a corner of the frame, and may be provided at e.g. one, two, three, or all four corners of the frame.

Figure 11:
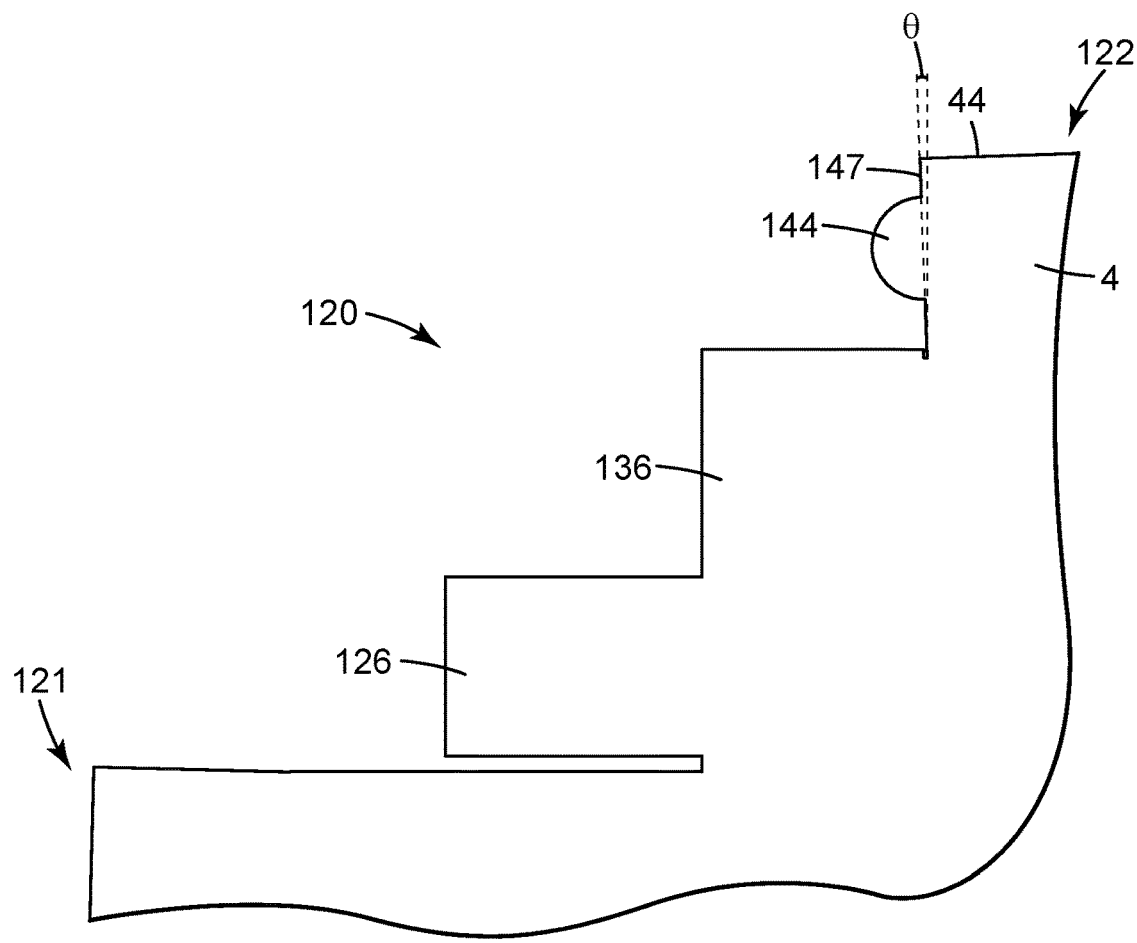
FIG. 11 is a plan view of a corner area of an exemplary frame part.
Figure 12:
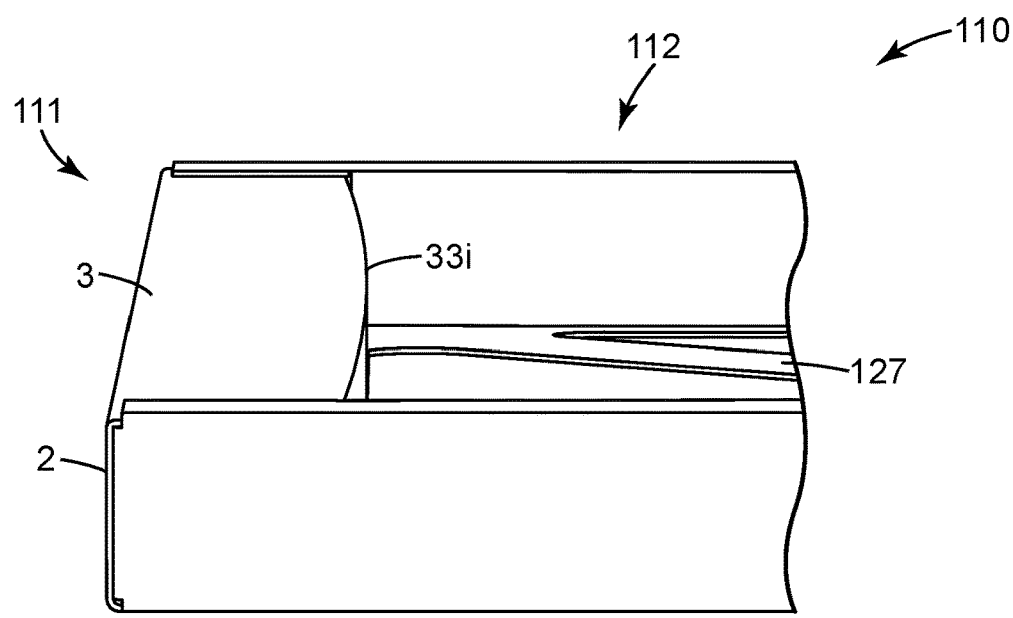
FIG. 12 is a side-rear perspective view of an exemplary frame portion that exhibits an inwardly bowed inner edge.
Figure 13:
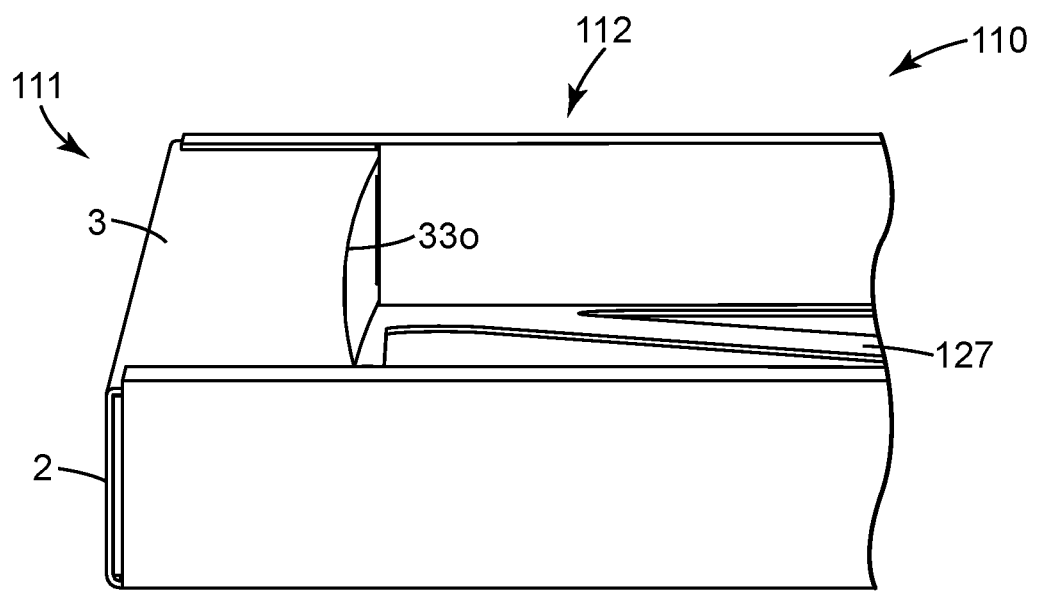
FIG. 13 is a side-rear perspective view of an exemplary frame portion that exhibits an outwardly bowed inner edge.

With reference to FIG. 11, an undercut angle θ may be achieved by arranging that terminal end 147 of a fourth panel 4 (as achieved e.g. by die-cutting a frame part 120 from a blank of e.g. chipboard) is oriented at an angle that is offset from a direction that would cause end 147 to align with the front-rear direction of the frame upon wrapping of the frame piece. In various embodiments, an undercut angle as described herein may be at least about 5, 10, or 15 degrees. In further embodiments, an undercut angle may be at most about 30, 25, 20, 15, or 10 degrees. Any locking tab (e.g. tab 144 of FIG. 11), if present, can be disregarded in calculating such angles.

The herein-described frame pieces may be wrapped and maintained in the wrapped configuration (and filter media attached thereto) to form a framed air filter using any or all of the arrangements above, by any suitable method and apparatus, whether relying on manual assembly, robotic assembly, or a mixture of the two. Any suitable mechanical fastening method may be used (staples, grommets and so on) to perform any of the above-described attachments. Instead of this, or as an adjunct to this, any suitable adhesive (e.g. pressure-sensitive adhesives, hot-melt adhesives, photocurable adhesives, wood glues, rubber cements, and so on) may be used. Such an adhesive may be chosen in view of the particular material that the frame is made of (e.g. plastic, metal, and so on). Since filter frames are often made of paperboard, chipboard, and the like, it may be convenient to use an adhesive that is well-suited for bonding of cellulosic materials. Of the aforementioned adhesives may be used in any location desired. In particular embodiments, such adhesives may be e.g. hot melt adhesives that are applied to desired surfaces of frame pieces, the various frame pieces then being wrapped and brought together at corners so that the adhesive-bearing surface(s) are brought together with mating surfaces as desired, and the adhesive allowed to cool and harden. In some embodiments, a frame piece may be at least partially wrapped before an adhesive is applied to it. In some embodiments, an adhesive may be applied to a surface of a frame piece and then allowed to cool and harden, after which the frame piece is wrapped and assembled to a neighboring frame piece. Then, while the frame piece(s) is held in the wrapped configuration, at least an adhesive-bearing portion of the frame piece(s) may be heated so as to activate (e.g., to at least partially remelt) the adhesive, then cooled to harden the adhesive. In some embodiments, an adhesive may be applied to the major surface of all of the frame pieces (e.g. adhesive may be applied to the entire major surface of a frame part in a single coating operation), after which the above-described wrapping, and joining of corners, may be performed. Combinations of adhesive bonding and mechanical fastening methods may be used if desired.

The above processes and arrangements can thus provide a wrapped frame. Any or all of the various herein-described corner-stabilizing arrangements may be used as desired, in any combination. For example, in some embodiments locking tabs and receiving slots of fourth panels of neighboring frame portions may be employed. In some embodiments, bonding of mating areas of third panels of neighboring frame portions may be employed. In particular embodiments, both arrangements may be used in combination. In some embodiments, corner tabs may be provided on second panels, and may be used with either or both of the previous arrangements. In some embodiments undercut angles may be used, and may be used with any or all of the previous arrangements. It will be appreciated that the above-presented wrapping processes, and the various corner-stabilizing arrangements, do not rely on attaching of any panel of any particular frame portion, to another panel of that same frame portion.

Bowed Inner Edge of Rear Wall

In a frame as described above, at least one, two, three, or e.g. all four frame portions may comprise an inner sidewall (provided by fourth panel 4 of the frame pieces) that comprises a free-floating terminal end 44 that is not attached to any other panel (in particular, is not attached to panel 1 which it is abutted proximate). It is thus desirable to stabilize the frame portion in the wrapped configuration, and in particular to minimize any tendency of inner sidewall 4 to partially unfold along fold line 43 due to any inherent resiliency (e.g. springiness) of the frame material. Such considerations may be particularly important in central segments of a relatively long frame portion. That is, while end segments (i.e. segments at frame corners) of an inner sidewall 4 of a frame portion may be largely prevented from any such partial unwrapping by the arrangements disclosed above, such arrangements may not necessarily be effective to prevent partial unwrapping in a central segment of a relatively long frame portion. In view of this, certain features can be included if desired that may help to minimize any such phenomena.

Thus in some embodiments, an inner edge 33 of a rear wall 3 of a frame portion (which inner edge is provided by folded fold line 43 between panels 3 and 4) may be bowed. This will cause the junction between the third panel 3 and the fourth panel 4 to exhibit an arcuate shape, which shape may act as an arch to minimize any tendency of the fourth panel to partially unfold along fold line 43. Such bowing may be inward (meaning that a central segment of rear wall 3 extends further inward than do the end segments of rear wall 3) as in the exemplary design of inner edge $33_i$ of FIG. 12. Or, such bowing may be outward (meaning that a central segment of rear wall 3 is recessed outward in comparison to the end segments of rear wall 3), as in the exemplary design of inner edge $33_o$ of FIG. 13.

An inner edge of this type will exhibit a bowing ratio, which denotes the amount of bow (in the inward-outward direction) per unit of elongate length of the frame portion. In various embodiments, an inner edge 33 of a rear wall of a frame portion may exhibit a bowing ratio of at least 0.5 mm, 0.7 mm, or 0.9 mm, of inward (or outward) bow per 10 cm of length along the frame portion. In further embodiments, an inner edge 33 of a rear wall of a frame portion may exhibit a bowing ratio of at most about 2.0, 1.5, or 1.2 mm of inward (or outward) bow per 10 cm of length along the frame portion. In many embodiments the bowing ratio may be at least generally constant along the elongate length of the frame portion, and the bowing may be at least generally symmetrical along the frame portion (so that the maximum bow occurs at the centermost segment of the frame portion).

By way of specific example, a frame portion that is 50 cm in elongate length and that comprises a constant, outward bowing ratio of 1.0 mm of bow per 10 cm of length, will exhibit a maximum outward bow of approximately 2.5 mm at the centerpoint of the frame portion. In other words, the position of inner edge $33_o$ at a location midway along the elongate length of the frame portion, will be recessed outward a distance of approximately 2.5 mm in comparison to the position of inner edge $33_o$ at ends of the frame portion at which the frame portion meets neighboring frame portions. (At positions halfway from each end of the frame portion to the midpoint of the frame portion, the frame will exhibit an outward bow of approximately 1.25 mm.)

A bowed inner edge of a rear wall may be particularly helpful in the case of a frame portion that is relatively long (e.g., that is longer than about 25 cm). Thus in some embodiments a frame that is rectangular in shape may comprise bowed inner edges of rear walls only for the two longest frame portions and not for the two shortest frame portions. However, in many embodiments it may be desired that bowed inner edges be provided for all four frame portions (regardless of e.g. whether the frame is rectangular or square). Any one or more (e.g. any desired combination) of the above-described corner-stabilizing arrangements may be used in combination with a bowed inner edge of a rear wall of a frame portion.

It will be understood that a bowed inner edge 33 of a rear wall 3 as described herein necessitates that fold line 43 between panels 3 and 4 exhibit an arcuate shape. This is evident in the case of fold line 43 of frame piece 121 as shown in FIG. 4. Terminal end 44 of fourth panel 4 may be at least essentially linear or it may exhibit a slight curvature, in order to provide that terminal end 44 of fourth panel 4 can abutted proximate first panel 1 in a desired manner, e.g. in a relatively uniform manner along the elongate length of the frame portion.

A frame 110 will define an active filtration area (i.e., an area in which a filter media will be present in the finished framed air filter) 401, which active filtration area may be e.g. empty space that is laterally outwardly bounded by the four frame portions. In other embodiments (as depicted in exemplary manner in FIGS. 2 and 4), one or more support members 127 may be provided that are integrally connected to first panels 1 of at least some pieces of the frame and that cross at least part of the active filtration area 401. Such support members, since they extend from the first panels 1 of the frame pieces (that is, from the frontmost portion of the finished frame) will be positioned on the "front" side of the framed filter as defined herein. However, it is emphasized that the "front" side of the herein-disclosed framed filters may be positioned upstream or downstream in an airstream. Thus, if support members 127 are present, they may be provided on a downstream side of the filter media so that they can support the media against the pressure of airflow. However, such support members may support the filter media from the front side, e.g. if the filter media is attached, e.g. adhesively bonded, to the support members in at least some locations. Furthermore, the term support member broadly encompasses not only elongate members of the general type shown in FIG. 4, but also includes arrangements in which perforations (e.g. circular cutouts) are provided in a support member that takes the form of a perforate sheet that extends across the active filtration area.

In addition to, or instead of, any such support member(s) that extend integrally from a frame portion, the disclosed framed air filter may include one or more support members that are provided separately from the frame (and which may be e.g. attached to the frame during assembly of the air filter). Moreover, the filter media itself may (e.g. if pleated) comprise any suitable pleat-stabilizing items such as members, strips, filaments, or the like. Such pleat-stabilizing items might be e.g. bonded only to the pleat tips; or they may follow (at least partially) the pleats of the media and thus may be bonded to pleat walls and/or valleys as well. Pleat-stabilizing items of the former type might include e.g. paperboard strips, polymeric filaments, and so on. Pleat-stabilizing items of the latter type might include e.g. wire meshes or chicken-wire type metal grids (e.g. that are applied to the filter media and then pleated along therewith), beads of drizzle glue, and so on.

As noted, any suitable filter media 400 may be used in the disclosed framed filter. In various embodiments filter media 400 may be unpleated (e.g., it may be generally or essentially flat) as in the exemplary embodiment of FIG. 6; or, filter media 400 may be pleated as in the exemplary embodiment of FIG. 1. If filter media 400 is pleated, filter media 400 will be compressible, meaning that the pleated edges (edges that exhibit a corrugated appearance in side view) of the filter media must be soft enough to be collapsed against first panel 1 under pressure from terminal end 44 of fourth panel 4 when end 44 is abutted proximal to first panel 1 as described earlier herein. Compressible pleated air filter media by definition will not comprise any kind of wire mesh or the like that is pleated along with the air filter media and that serves to stabilize the pleats thereof. However, compressible pleated air filter media does allow the presence of polymeric filaments that are bonded to pleat tips of at least one side of the pleated filter media; e.g., the type of polymeric filaments disclosed in U.S. Pat. No. 9,174,159.

If media 400 is pleated, in some embodiments media 400 may be oriented so that the pleated media resides at least generally, or essentially, within the volume defined by the frontmost and rearmost faces of the frame. (Such a design may be contrasted to a design in which e.g. at least portions of the pleats protrude forwardly beyond the front face of the frame.)

LIST OF EXEMPLARY EMBODIMENTS

Embodiment 1 is a framed air filter, comprising: an air filter media comprising a generally rectangular perimeter with four major edges; and, a frame comprising four frame portions, each frame portion being mounted on one of the four major edges of the air filter media and with neighboring frame portions meeting to form corners of the frame, wherein at least one of the frame portions is provided by a frame piece that comprises first, second, third and fourth panels that are foldably connected by fold lines, which single frame piece is wrapped in a generally rectangular configuration so that the fourth panel comprises a forward terminal end that is abutted proximal a rearward major surface of the first panel, wherein the fourth panel provides an inner sidewall of the frame portion and the first panel provides a front wall of the frame portion, and wherein a segment of a border area of the air filter media is sandwiched between the forward terminal end of the fourth panel and the rearward major surface of the first panel, and, wherein the third panel provides a rear wall of the frame portion, which rear wall exhibits an inner edge that is provided by a fold line that foldably connects the third panel to the fourth panel, and wherein the inner edge of the rear wall is bowed so as to exhibit a bowing ratio of from at least 0.5 mm, to about 2.0 mm, of bow per 10 cm of length of the frame portion.

Embodiment 2 is the framed air filter of embodiment 1, wherein the inner edge of the rear wall is outwardly bowed so as to exhibit a bowing ratio of from about 0.7 to 1.2 mm of outward bow per 10 cm of length of the frame portion.

Embodiment 3 is the framed air filter of any of embodiments 1-2, wherein the forward terminal end of the inner sidewall is a floating end that is not attached to the rearward major surface of the first panel and wherein the air filter media is adhesively bonded to the rearward major surface of the first panel in at least some portion of the border area of the air filter media.

Embodiment 4 is the framed air filter of any of embodiments 1-3, wherein the second panel of the frame piece provides an outer sidewall of the frame portion.

Embodiment 5 is the framed air filter of any of embodiments 1-4 wherein: the first and second panels of the frame piece are foldably connected to each other along a first fold line of the frame piece; the second and third panels of the frame piece are foldably connected to each other along a second fold line that is separate from the first fold line and is parallel to the first fold line at all points along the length of the first and second fold lines; and, the fold line that foldably connects the third panel to the fourth panel is a third fold line that is separate from the first and second fold lines and that is arcuate in shape so that it is not parallel to the second fold line, or to the first fold line, at least at some locations along the length of the third fold line.

Embodiment 6 is the framed air filter of embodiment 5, wherein a major plane of the third panel is oriented within plus or minus 10 degrees of a major plane of the first panel; and, wherein a major plane of the fourth panel is oriented within plus or minus 10 degrees of a major plane of the second panel.

Embodiment 7 is the framed air filter of any of embodiments 1-6, wherein the air filter media is a flat, unpleated media.

Embodiment 8 is the framed air filter of any of embodiments 1-6, wherein the air filter media is a compressible, pleated media.

Embodiment 9 is the framed air filter of any of embodiments 1-8, wherein two of the four frame portions that comprise the frame are opposing, equilength frame portions that each comprise a rear wall with an inner edge that is bowed, and wherein the two opposing, equilength frame portions that each exhibit a bowed inner edge, are at least as long in elongate length as the two other frame portions.

Embodiment 10 is the framed air filter of any of embodiments 1-9 wherein the four frame portions that comprise the frame, each comprise a rear wall with an inner edge that is bowed.

Embodiment 11 is the framed air filter of any of embodiments 1-10 wherein a second panel of a first frame portion comprises a corner tab that extends integrally from a terminal end of the second panel of the first frame portion and is hingedly connected thereto by a hinged connection that defines an outer sidewall of the frame at a corner between the first frame portion and a second, neighboring frame portion; and, wherein the corner tab extends from the first frame portion at an angle of about 90 degrees so as to be in inward or outward overlapping relation with a mating area of a second panel of the second, neighboring frame portion, and is attached to the mating area.

Embodiment 12 is the framed air filter of any of embodiments 1-11 wherein an area of a third panel of a first frame portion is in rearwardly overlapping relation with a mating area of a third panel of a second, neighboring frame portion, and is attached thereto.

Embodiment 13 is the framed air filter of any of embodiments 1-12 wherein a fourth panel of a first frame portion comprises a locking tab that integrally extends from a terminal end of the fourth panel of the first frame portion and is outwardly inserted into a receiving slot of a fourth panel of a second, neighboring frame portion.

Embodiment 14 is the framed air filter of any of embodiments 1-13 wherein a terminal end of a fourth panel of a first frame portion exhibits an undercut angle of from at least 5 degrees to at most about 20 degrees.

Embodiment 15 is the framed air filter of any of embodiments 1-14 wherein the frame comprising four frame portions is provided by a single frame part that includes four frame pieces, each of which frame pieces is wrapped so as to provide one of the four frame portions, and wherein the single frame part is configured so that neighboring frame portions that meet to form corners of the frame are integrally connected to each other along first panels of each frame piece, which first panels collectively provide a front wall of the frame.

Embodiment 16 is the framed air filter of embodiment 15 wherein the single frame part further includes one or more support members that are integrally connected to first panels of at least some frame pieces and that cross at least part of an active filtration area of the framed air filter, which active filtration area is laterally bounded by the four frame portions.

Embodiment 17 is the framed air filter of embodiment 16 wherein the framed air filter comprises indicia indicating that a front side of the framed air filter is an upstream side of the framed air filter as the framed air filter is installed into an air-handling system, and wherein the at least one or more support members are positioned upstream of the air filter media with a downstream major surface of at least one of the one or more support members being adhesively bonded to an upstream surface of the air filter media.

Embodiment 18 is a framed air filter comprising: an air filter media comprising a generally rectangular perimeter with four major edges; and, a frame comprising four frame portions, each frame portion being mounted on one of the four major edges of the air filter media and with neighboring frame portions meeting to form corners of the frame, wherein at least one of the frame portions is provided by a frame piece that comprises first, second, third and fourth panels that are foldably connected by fold lines, which single frame piece is wrapped in a generally rectangular configuration so that the fourth panel comprises a forward terminal end that is abutted proximal a rearward major surface of the first panel, wherein the fourth panel provides an inner sidewall of the frame portion and the first panel provides a front wall of the frame portion, and wherein a segment of a border area of the air filter media is sandwiched between the forward terminal end of the fourth panel and the rearward major surface of the first panel, and, wherein the third panel provides a rear wall of the frame portion; and further wherein: the forward terminal end of the inner sidewall is a floating end that is not attached to the rearward major surface of the first panel and the air filter media is adhesively bonded to the rearward major surface of the first panel in at least some portion of the border area of the air filter media, wherein an area of a third panel of a first frame portion is in rearwardly overlapping relation with a mating area of a third panel of a second, neighboring frame portion, and is attached thereto, wherein a fourth panel of a first frame portion comprises a locking tab that integrally extends from a terminal end of the fourth panel of the first frame portion and is outwardly inserted into a receiving slot of a fourth panel of a second, neighboring frame portion, and wherein the terminal end of the fourth panel of the first frame portion exhibits an undercut angle of from at least 5 degrees to at most about 20 degrees.

Embodiment 19 a method of filtering air, the method comprising passing the air to be filtered through the air filter media of the framed air filter of any of embodiments 1-18.

Embodiment 20 is a method of making a framed air filter, the method comprising wrapping a frame piece of any of embodiments 1-18 into a generally rectangular configuration so as to provide a frame portion with a rear wall that exhibits an inner edge that is bowed so as to exhibit a bowing ratio of from at least 0.5 mm, to about 2.0 mm, of bow per 10 cm of length of the frame portion.

It will be apparent to those skilled in the art that the specific exemplary elements, structures, features, details, configurations, etc. that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

What is claimed is:

1. A framed air filter, comprising:
    an air filter media comprising a generally rectangular perimeter with four major edges;
    and,
    a frame comprising four frame portions, each frame portion being mounted on one of the four major edges of the air filter media and with neighboring frame portions meeting to form corners of the frame,
        wherein at least one of the frame portions is provided by a frame piece that comprises first, second, third and fourth panels that are foldably connected by fold lines, which single frame piece is wrapped in a generally rectangular configuration so that the fourth panel comprises a forward terminal end that is abutted proximal a rearward major surface of the first panel, wherein the fourth panel provides an inner sidewall of the frame portion and the first panel provides a front wall of the frame portion, and wherein a segment of a border area of the air filter media is sandwiched between the forward terminal end of the fourth panel and the rearward major surface of the first panel, and, wherein the third panel provides a rear wall of the frame portion, which rear wall exhibits an inner edge that is provided by a fold line that foldably connects the third panel to the fourth panel, and wherein the inner edge of the rear wall is bowed so as to exhibit a bowing ratio of from at least 0.5 mm, to about 2.0 mm, of bow per 10 cm of length of the frame portion.

2. The framed air filter of claim 1, wherein the inner edge of the rear wall is outwardly bowed so as to exhibit a bowing ratio of from about 0.7 to 1.2 mm of outward bow per 10 cm of length of the frame portion.

3. The framed air filter of claim 1, wherein the forward terminal end of the inner sidewall is a floating end that is not attached to the rearward major surface of the first panel and wherein the air filter media is adhesively bonded to the rearward major surface of the first panel in at least some portion of the border area of the air filter media.

4. The framed air filter of claim 1, wherein the second panel of the frame piece provides an outer sidewall of the frame portion.

5. The framed air filter of claim 1 wherein:
the first and second panels of the frame piece are foldably connected to each other along a first fold line of the frame piece;
the second and third panels of the frame piece are foldably connected to each other along a second fold line that is separate from the first fold line and is parallel to the first fold line at all points along the length of the first and second fold lines;
and,
the fold line that foldably connects the third panel to the fourth panel is a third fold line that is separate from the first and second fold lines and that is arcuate in shape so that it is not parallel to the second fold line, or to the first fold line, at least at some locations along the length of the third fold line.

6. The framed air filter of claim 5, wherein a major plane of the third panel is oriented within plus or minus 10 degrees of a major plane of the first panel; and, wherein a major plane of the fourth panel is oriented within plus or minus 10 degrees of a major plane of the second panel.

7. The framed air filter of claim 1, wherein the air filter media is a flat, unpleated media.

8. The framed air filter of claim 1, wherein the air filter media is a compressible, pleated media.

9. The framed air filter of claim 1, wherein two of the four frame portions that comprise the frame are opposing, equilength frame portions that each comprise a rear wall with an inner edge that is bowed, and wherein the two opposing, equilength frame portions that each exhibit a bowed inner edge, are at least as long in elongate length as the two other frame portions.

10. The framed air filter of claim 1 wherein the four frame portions that comprise the frame, each comprise a rear wall with an inner edge that is bowed.

11. The framed air filter of claim 1 wherein a second panel of a first frame portion comprises a corner tab that extends integrally from a terminal end of the second panel of the first frame portion and is hingedly connected thereto by a hinged connection that defines an outer sidewall of the frame at a corner between the first frame portion and a second, neighboring frame portion; and,
wherein the corner tab extends from the first frame portion at an angle of about 90 degrees so as to be in inward or outward overlapping relation with a mating area of a second panel of the second, neighboring frame portion, and is attached to the mating area.

12. The framed air filter of claim 1 wherein an area of a third panel of a first frame portion is in rearwardly overlapping relation with a mating area of a third panel of a second, neighboring frame portion, and is attached thereto.

13. The framed air filter of claim 1 wherein a fourth panel of a first frame portion comprises a locking tab that integrally extends from a terminal end of the fourth panel of the first frame portion and is outwardly inserted into a receiving slot of a fourth panel of a second, neighboring frame portion.

14. The framed air filter of claim 1 wherein a terminal end of a fourth panel of a first frame portion exhibits an undercut angle of from at least 5 degrees to at most about 20 degrees.

15. The framed air filter of claim 1 wherein the frame comprising four frame portions is provided by a single frame part that includes four frame pieces, each of which frame pieces is wrapped so as to provide one of the four frame portions, and wherein the single frame part is configured so that neighboring frame portions that meet to form corners of the frame are integrally connected to each other along first panels of each frame piece, which first panels collectively provide a front wall of the frame.

16. The framed air filter of claim 15 wherein the single frame part further includes one or more support members that are integrally connected to first panels of at least some frame pieces and that cross at least part of an active filtration area of the framed air filter, which active filtration area is laterally bounded by the four frame portions.

17. The framed air filter of claim 16 wherein the framed air filter comprises indicia indicating that a front side of the framed air filter is an upstream side of the framed air filter as the framed air filter is installed into an air-handling system, and wherein the at least one or more support members are positioned upstream of the air filter media with a downstream major surface of at least one of the one or more support members being adhesively bonded to an upstream surface of the air filter media.

18. A method of filtering air, the method comprising passing the air to be filtered through the air filter media of the framed air filter of claim 1.

19. A method of making a framed air filter, the method comprising wrapping a frame piece of claim 1 into a generally rectangular configuration so as to provide a frame portion that comprises a rear wall that exhibits an inner edge that is bowed so as to exhibit a bowing ratio of from at least 0.5 mm, to about 2.0 mm, of bow per 10 cm of length of the frame portion.

* * * * *